(12) United States Patent
Nordback

(10) Patent No.: US 11,748,960 B1
(45) Date of Patent: Sep. 5, 2023

(54) PRINTED CIRCUIT BOARD (PCB) VIRTUAL X-RAY VISUALIZATION

(71) Applicant: Konica Minolta Business Solutions U.S.A., Inc., San Mateo, CA (US)

(72) Inventor: Kurt Nathan Nordback, Boulder, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 0 days.

(21) Appl. No.: 17/710,966

(22) Filed: Mar. 31, 2022

(51) Int. Cl.
*G06T 19/00* (2011.01)
*G06T 15/08* (2011.01)
*G06T 7/80* (2017.01)
*G06T 7/11* (2017.01)

(52) U.S. Cl.
CPC ............. *G06T 19/006* (2013.01); *G06T 7/11* (2017.01); *G06T 7/80* (2017.01); *G06T 15/08* (2013.01); *G06T 2207/10116* (2013.01)

(58) Field of Classification Search
None
See application file for complete search history.

(56) References Cited

U.S. PATENT DOCUMENTS

2011/0164163 A1* 7/2011 Bilbrey ............... H04N 23/632
348/E5.022

FOREIGN PATENT DOCUMENTS

DE  3433457 A1  3/1986
EP  0304943 A2  3/1989

OTHER PUBLICATIONS

"PCB Repair Station Built on Highly Accurate Gantry Reduces Scrapped Boards"; isel USA; Retrieved from the Internet: URL: https://www.isel-us.com/application-stories/circuit-board-inspection (5 pages).

* cited by examiner

*Primary Examiner* — Robert J Craddock
(74) *Attorney, Agent, or Firm* — Osha Bergman Watanabe & Burton LLP

(57) ABSTRACT

A method for visualizing a reference object in an augmented reality (AR) workspace includes: calibrating the AR workspace by mapping a first coordinate space to the AR workspace; projecting an interface with control elements onto the AR workspace; obtaining an image of the AR workspace that includes the interface and the reference object; identifying the reference object in the image using an image recognition algorithm; retrieving a reference file associated with the reference object, where the reference file includes structural information describing one or more layers of the reference object; identifying a first point of interest (POI) on the reference object; generating, based on the structural information of the reference file, a virtual x-ray representation of structures of the reference object; projecting the virtual x-ray representation onto the AR workspace. The virtual x-ray representation includes a rendering of an internal structure of the reference object.

20 Claims, 9 Drawing Sheets

US 11,748,960 B1

PRINTED CIRCUIT BOARD (PCB) VIRTUAL X-RAY VISUALIZATION

BACKGROUND

Augmented Reality (AR) allows a user to view and/or interact with a computer-generated output overlaid on or around a physical object in the real-world environment. In some cases, the computer-generated output may include information that cannot be perceived by the user that is observing or interacting with the physical object. For example, a printed circuit board (PCB) consists of layers of an insulating epoxy-composite material sandwiched together with layers of conductive traces, pads, and/or electronic components. When diagnosing or repairing PCBs, it can be useful for the user to be able to see the full structure of a board, including a schematic of an internal layer of the PCB, which may not be visible while looking directly at the physical object.

SUMMARY

In general, one or more embodiments of the invention relate to a method for visualizing a reference object in an augmented reality (AR) workspace. The method comprises: calibrating the AR workspace by mapping a first coordinate space to the AR workspace; projecting an interface with control elements onto the AR workspace; obtaining an image of the AR workspace that includes the interface and the reference object; identifying the reference object in the image using an image recognition algorithm; retrieving a reference file associated with the reference object, where the reference file includes structural information describing one or more layers of the reference object; identifying a first point of interest (POI) on the reference object; generating, based on the structural information of the reference file, a virtual x-ray representation of structures of the reference object located at the first POI; projecting the virtual x-ray representation onto the AR workspace. The virtual x-ray representation includes a rendering of an internal structure of the reference object at the first POI.

In general, one or more embodiments of the invention relates to a non-transitory computer readable medium (CRM) storing computer readable program code for visualizing a reference object in an augmented reality (AR) workspace. The computer readable program code causes a computer to: calibrate the AR workspace by mapping a first coordinate space to the AR workspace; project an interface with control elements onto the AR workspace; obtain an image of the AR workspace that includes the interface and the reference object; identify the reference object in the image using an image recognition algorithm; retrieve a reference file associated with the reference object, where the reference file includes structural information describing one or more layers of the reference object; identify a first point of interest (POI) on the reference object; generate, based on the structural information of the reference file, a virtual x-ray representation of structures of the reference object located at the first POI; project the virtual x-ray representation onto the AR workspace. The virtual x-ray representation includes a rendering of an internal structure of the reference object at the first POI.

In general, one or more embodiments of the invention relates to a system for visualizing a reference object in an augmented reality (AR) workspace. The system comprises: a memory; and a processor coupled to the memory. The processor is configured to: calibrate the AR workspace by mapping a first coordinate space to the AR workspace; project an interface with control elements onto the AR workspace; obtain an image of the AR workspace that includes the interface and the reference object; identify the reference object in the image using an image recognition algorithm; retrieve a reference file associated with the reference object from the memory, where the reference file includes structural information describing one or more layers of the reference object; identify a first point of interest (POI) on the reference object; generate, based on the structural information of the reference file, a virtual x-ray representation of structures of the reference object located at the first POI; project the virtual x-ray representation onto the AR workspace. The virtual x-ray representation includes a rendering of an internal structure of the reference object at the first POI.

Other aspects of the invention will be apparent from the following description and the appended claims.

DETAILED DESCRIPTION

Figure 1:
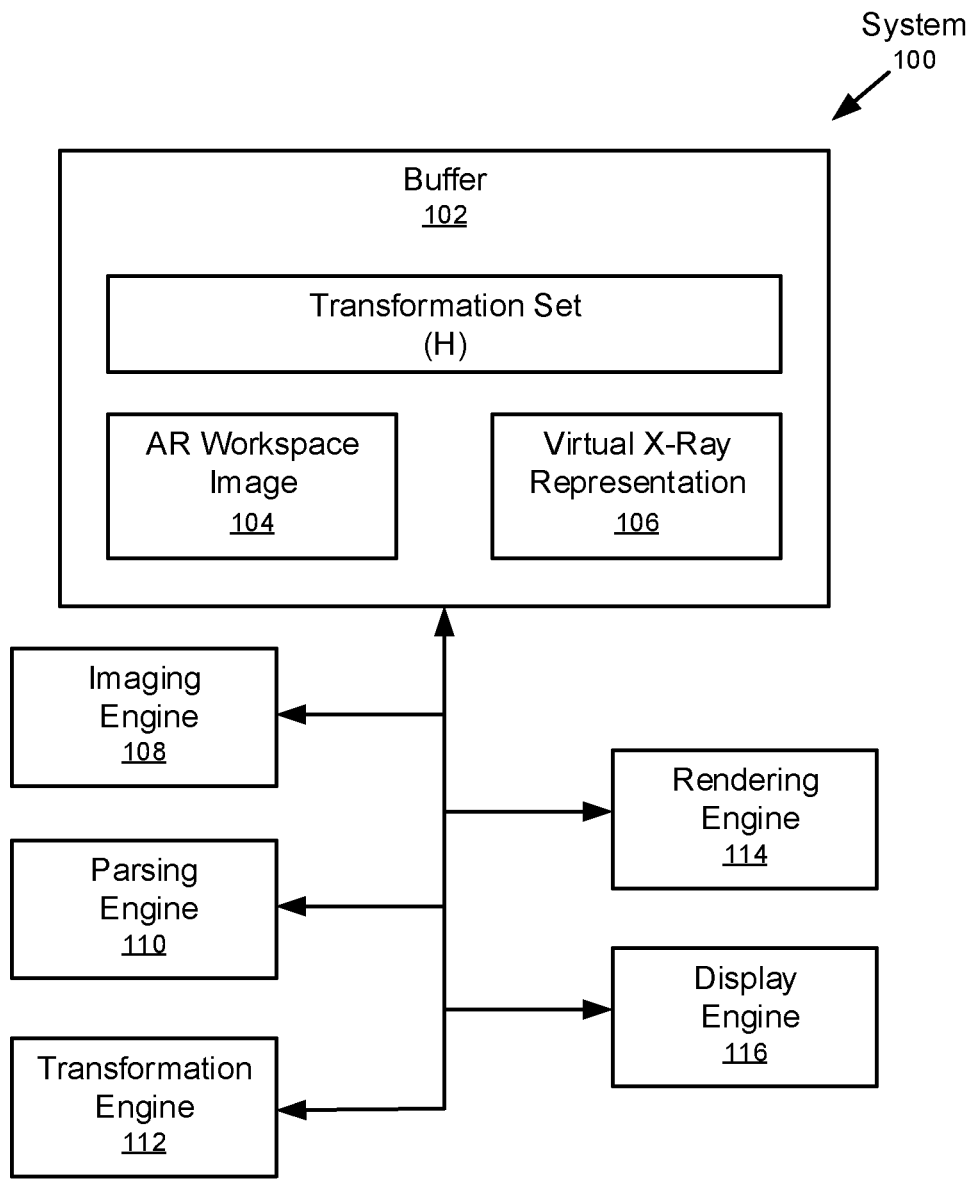
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

Interacting with objects in a real-world environment is often limited by a user's physical senses (e.g., touch and sight). For example, when working on a multi-layer PCB, the user is limited to observing electronic components (e.g., traces, pads, through holes, active/passive circuit elements) that are disposed on the surface of the PCB facing the user. PCBs are typically designed using software (e.g., computer-aided design (CAD) software) that allows for viewing multiple layers simultaneously. However, relating a design schematic from the screen of a computer to the physical PCB on a workbench board can be difficult, especially for PCBs with multiple layers, complex/dense/miniaturized layout designs, and/or visually similar pattern regions. Therefore, a method of relating the design schematic, including inaccessible internal regions at a given point on a PCB, to the physical workspace around the PCB may be useful to a user. It will be appreciated that the present invention is not limited to visualizing internal regions of PCBs and that the present invention may be applied to any reference object that includes an internal structure.

In general, embodiments of the invention provide a method, a non-transitory computer readable medium (CRM), and a system for visualizing a reference object in an augmented reality (AR) workspace. More specifically, embodiments of the invention are directed to processing an image of the reference object and projecting a virtual x-ray representation of the reference object into the AR workspace to aid a user's understanding of the internal structural arrangement of the reference object. The virtual x-ray representation may include one or more views of internal structures based on information retrieved from a reference file (e.g., a collection of one or more computer aided design (CAD) files, electronic schematic files, diagnostic files, and/or any other appropriate files that include information about the reference object). Furthermore, the virtual x-ray representation may include additional information blocks or visual indicator blocks to help the user correlate the internal structures indicated by the virtual x-ray representation with the physical reference object in the AR workspace.

The AR workspace may be a surface of any type (e.g., a desk, a wall, a whiteboard, a PCB platen) that is configured to display a projected AR overlay. The AR workspace may comprise one or more mats with a calibrated work surface, ordinary work surfaces (e.g., a desk), irregular work surfaces (e.g., a textured or uneven surface), spatially separated surfaces, any combination thereof, but is not particularly limited to these configurations.

FIG. 1 shows a system (100) in accordance with one or more embodiments of the invention. The system (100) has multiple components, and may include, for example, a buffer (102), an imaging engine (108), a parsing engine (110), a transformation engine (112), a rendering engine (114), and a display engine (116). Each of these components (102, 108, 110, 112, 114, and 116) may be located on the same computing device (e.g., Projection with Interactive Capture (PIC) device, personal computer (PC), laptop, tablet PC, smartphone, multifunction peripheral, kiosk, server) or on a combination of different computing devices connected by a network of any size having wired and/or wireless connections. Each of the components of the system (100) is described in further detail below.

The buffer (102) may be implemented in hardware (i.e., circuitry), software, or any combination thereof. The buffer (102) is configured to store an AR workspace image (104), a virtual x-ray representation (106), and a transformation set (H). Multiple AR workspace images (104), virtual x-ray representations (106), or transformation sets (H) may be stored in the buffer (102).

An AR workspace image (104) is an image of an AR workspace. Accordingly, the AR workspace image (104) may be a single image or a composite of multiple images to accommodate the geometry of the AR workspace. The AR workspace image (104) may be saved in the buffer (102) in any imaging format (e.g., bitmap file format, JPEG image, GIF image, TIFF image, PDF document).

In one or more embodiments, the AR workspace image (104) captures an interface region, a reference region, and a projection region of the AR workspace, each of which is described below. The interface region, reference region, and projection region may be spatially distinct from each other, partially overlap, or completely overlap. Although the AR workspace is described as having three regions, in other embodiments of the invention, the AR workspace may have more or fewer regions. Furthermore, the functionality of each region described above may be shared among multiple regions or performed by a different region.

The interface region of the AR workspace is a region of any size or shape that includes an interface of the AR workspace. The interface may include one or more control elements (e.g., virtual buttons, knobs, sliders, etc.) for user interaction. For example, the interface may be part of an AR overlay that is projected onto the surface of the AR workspace. By capturing the interface in the AR workspace image (104), the user may activate controls within the AR workspace without diverting attention away from the reference object in the AR workspace. Furthermore, the interface in the AR workspace may be supplemented by physical controls and/or input devices of a connected computer device.

The reference region of the AR workspace is a region of any size or shape in the AR workspace that includes the reference object. As discussed above, the reference object may be a PCB, multi-layer PCB, or any physical object with an internal structure. By capturing the reference region in the AR workspace image (104), the system (100) may actively track the location and orientation of the reference object to update the virtual x-ray representation (106).

The projection region is a region of any size or shape in the AR workspace that includes the projected AR overlay, including the virtual x-ray representation (106). The projection region may be predefined and physically separated from the reference region and/or the interface region to simplify parsing of the AR workspace image (104). In one or more embodiments, the reference region and projection region may overlap such that the projected AR overlay may include information projected directly onto the reference object. By capturing the projection region in the AR workspace image (104), the system (100) may monitor the user's interaction with the virtual x-ray representation (106) and contextually update the virtual x-ray representation (106).

The virtual x-ray representation (106) may include one or more views, magnified or at-scale, of the reference object. For example, a view that is at the same scale as the reference object (i.e., not magnified) may be most useful with a virtual x-ray representation (106) projected onto the reference object. A view that is magnified may be most useful when projected into a separate projection region. In one or more embodiments where the reference object is a PCB, the virtual x-ray representation (106) may be a view that is produced by rendering the PCB design file (e.g., a CAD file) as a cropped and scaled image based on one or more points of interest on the PCB. As discussed in further detail below with respect to the parsing engine (110) and rendering engine (114), the virtual x-ray representation (106) may be updated based on the AR workspace (e.g., movement of the reference object, movement of a pointer, activation of controls). In general, the virtual x-ray representation (106) may include a visual depiction of an internal structure of the reference object that is projected into the real-world environment.

The transformation set (H) may include one or more geometric transformations (e.g., mathematical relationships) that define a relationship between two different coordinate systems (i.e., coordinate spaces). For example, when a projector projects an image onto an AR workspace and a camera captures an image of the AR workspace, the projected image and a captured image of the projection may not be identical due to differences between the projector and camera (e.g., spatial separation, resolution, field of view, color space, etc.). Geometric transformations may be used to reconcile one or more of the differences (e.g., scale, rotation, perspective, resolution, etc.) between the projected image and the captured image of the projection. By applying an appropriate transformation to the captured image, the transformed captured image may appear identical to the projected image. In one or more embodiments, the transformation may be reversible (i.e., when an inverse of the transformation is applied to the projected image, the transformed projected image may appear identical to the captured image).

In one or more embodiments, the transformation set (H) includes a transformation between a first coordinate space of the AR workspace (e.g., the projection region) and a second coordinate space of the reference object (e.g., the reference region). Therefore, the transformation set (H) may include transformations such as: a camera-to-projector transformation between the camera coordinate space and the projector coordinate space; a projector-to-world transformation between the projector coordinate space and the first coordinate space of the AR workspace and/or the second coordinate space of the reference object; a camera-to-world transformations between the camera coordinate space and the first coordinate space of the AR workspace and/or the second coordinate space of the reference object. Furthermore, any appropriate single transformation (e.g., rotation, translation, scale, skew, cropping, or any appropriate image processing function) or combination of transformations, such as a convolution of one or more transformations may be included in the transformation set (H). By using the transformation set (H), virtual and real locations in the AR workspace may be spatially related with greater accuracy.

The system (100) includes an imaging engine (108). The imaging engine (108) may be implemented in hardware (i.e., circuitry), software, or any combination thereof. The imaging engine (108) obtains the AR workspace image (104) with a 2-dimensional and/or 3-dimensional imager (e.g., one or more cameras that operate any appropriate wavelength range, a depth camera, a hyperspectral camera) that records digital images of the AR workspace. In one or more embodiments, the imaging engine (108) includes a camera of a Projection with Interactive Capture (PIC) device that also includes a projector.

In one or more embodiments, a user may set a timing such that the imaging engine (108) automatically obtains an AR workspace image (104) at periodic intervals (e.g., continuous operation). Alternatively, the user may asynchronously trigger the imaging engine (108) (e.g., by physical control, virtual control, or gesture recognized by the system (100)) to obtain an AR workspace image (104). However, the methods to control the timing and frequency of obtaining images are not limited to those described herein and any appropriate timing may be used.

The system (100) further includes a parsing engine (110). The parsing engine (110) may be implemented in hardware (i.e., circuitry), software, or any combination thereof. The parsing engine (110) parses the AR workspace image (104) to identify and extract information from the AR workspace and associated reference files. Further, the parsing engine (110) may segment the AR workspace image (104) into multiple images that may be parsed individually (e.g., an image corresponding to the reference region, an image corresponding more specifically to the reference object, an image corresponding to the interface, an image corresponding to the projection region). The parsing engine (110) may manipulate the AR workspace image (104) to improve the quality of the extracted content. For example, the parsing engine (110) may: apply a transform (e.g., rotation, scaling, and skew) to the AR workspace image (104); crop the AR workspace image (104); combine multiple AR workspace images (104). However, the methods of manipulating and parsing an AR workspace image (104) are not limited to those described herein and that any appropriate method may be used.

The parsing engine (110) may utilize the transformation set (H) to attribute a location information (i.e., coordinates in one or more coordinate spaces) to objects identified in the AR workspace image (104). For example, the parsing engine (110) may calibrate the AR workspace by mapping a first coordinate space to the AR workspace and a second coordinate space to the reference object. In addition, the parsing engine (110) may generate or update one or more transformations in the transformation set (H) based on objects identified in the AR workspace image (104).

The parsing engine (110) may perform an optical character recognition (OCR) or image recognition (e.g., pattern, shape, and/or non-text content analysis) to identify, format, and extract content (e.g., a reference object, a pointer, a text character, a non-text character, a string of text, a grid, a line, a drawing, a picture, a chart, an image, a graph, or a table) within an AR workspace image (104). Furthermore, the parsing engine (110) may determine a reference file associated with the reference object (e.g., a computer aided design file, a diagnostic results file, a manufacturing report, an invoice, etc.) based on identifying information extracted from the AR workspace image (104). The reference file may include multiple files (e.g., multiple versions/revisions of a CAD file) including files with multiple types of information (e.g., structural, diagnostic, inventory, engineering, marketing, logistic information). The reference file may be stored and accessed from the buffer (102) or from the memory of a networked computing device (e.g., personal computer, smart phone, server, cloud server).

The parsing engine (110) may use an image recognition algorithm to identify and locate a pointer within an AR workspace image (104). The image recognition algorithm may be the same as or different from the image recognition algorithm used to identify the reference object. The pointer may be a hand, a finger, a stylus, a pen/pencil, a soldering iron, a knife, a scribe, or any appropriate tool for indicating a point of interest in the AR workspace. In one or more embodiments, the parsing engine (110) may identify a point of interest at a predetermined offset from the pointer (e.g., a predetermined distance from a fingertip or stylus to improve visibility for the user). The parsing engine (110) may utilize the transformation set (H) to determine a location of the pointer or a point of interest in one or more coordinate spaces. For example, the parsing engine (110) may identify a first pointer located on the reference object and a second pointer located in a region of the virtual x-ray representation.

Any common or proprietary parsing program (e.g., a word recognition program, a table recognition program, an image recognition program) that is able to identify and extract information from an image or a reference file may be utilized by the parsing engine (110). The parsing engine (110) may store the extracted content in the buffer (102) to generate or update the virtual x-ray representation (106).

The system (100) includes a transformation engine (112). The transformation engine (112) may be implemented in hardware (i.e., circuitry), software, or any combination thereof. The transformation engine (112) computes and applies transformations of the transformation set (H) to images captured by the imaging engine (108), images rendered by the rendering engine (114), and images projected by the display engine (116).

Any program (e.g., an image processing program) that is able to manipulate images may be utilized by the transformation engine (112). Furthermore, the transformation engine (112) may work in combination with one or more other engines of the system (100) to generate, update, and/or apply transformations to an image (e.g., generate and store a transformation that relates a first coordinate space of the AR workspace and the second coordinate space). For example, the transformation engine (112) may apply a cropping transformation, to prepare an image for the parsing engine (110), based on information about the size and shape of the various regions of the AR workspace. The transformation engine (112) may map a first coordinate space to the entire AR workspace based on a registration feature on a surface of the AR workspace that is identified by the parsing engine (110). In one or more embodiments where the reference object is a PCB, the transformation engine (112) may map a second coordinate space to the PCB based on a registration feature of the PCB that is identified by the parsing engine (110).

The system (100) includes a rendering engine (114). The rendering engine (114) may be implemented in hardware (i.e., circuitry), software, or any combination thereof. The rendering engine (114) renders AR overlay images comprising the virtual x-ray representation (106) that are to be projected by the display engine (116) into the AR workspace. Any rendering software (e.g., a program for viewing and/or editing a word file, an image file, a CAD file, etc.) that is able to render an image may be utilized by the rendering engine (114). For example, the rendering engine (114) may access a reference file to obtain structural information for rendering structures in one or more layers of the reference object. In addition, the rendering engine (114) may utilize the transformation set (H) to render images with an appropriate scale and position to align physical and virtual objects in the AR workspace. A rendering may consist of one or more predefined views (e.g., a plan view, an orthographic view, an isometric view, one or more views from a predetermined direct).

In one or more embodiments where the reference is a PCB, the rendering engine (114) may generate a plan view of the PCB for each discrete layer or surface of the PCB, as described in one or more reference files, and store the images as virtual layers of the virtual x-ray representation (106). Further, the rendering engine (114) may combine one or more rendered images to illustrate a relationship between structures of the PCB (e.g., a conductive via connecting adjacent layers, a conductive trace that connects electrical components within a layer). The rendering engine (114) may control the size, color palette, orientation, magnification, or any combination thereof for each virtual layers of the virtual x-ray representation (106) to distinguish between different structures/layers of the PCB.

In one or more embodiments, the rendering engine (114) may further render an information block describing the PCB or a point of interest on the PCB. For example, the rendering engine (114) may render or highlight a point of interest on the PCB that includes an abnormal structure identified by a diagnostic information in the reference file. Further, the rendering engine (114) may render an indicator block that correlates two locations in the AR workspace. For example, the indicator block may include a connecting line between a feature rendered in the virtual x-ray representation (106) and the corresponding feature on the physical reference object. Alternatively, or in addition, the indicator block may visually correlate the information block with a feature on the reference object and/or in the virtual x-ray representation (106).

The rendering engine (114) may include one or more controls (virtual or physical) for a user to manipulate the contents of the AR overlay or the virtual x-ray representation (106). For example, the control elements of the interface projected into the AR workspace may be used to filter the type of structures or layers of the reference file that are rendered in the virtual x-ray representation (106). In one or more embodiments, the controls may control a size, color palette, orientation, magnification, or any combination thereof for the virtual x-ray representation (106). However, the controls of the rendering engine (114) are not limited to the examples described herein and any appropriate controls may be included to provide the desired AR overlay.

The system (100) includes a display engine (116). The display engine (116) may be implemented in hardware (i.e., circuitry), software, or any combination thereof. The display engine (116) may project the interface and the virtual x-ray representation (106) onto the AR workspace using one or more lights, lasers, effects, and/or projections. In addition, the display engine (116) may additionally display a version of virtual x-ray representation (106) on an output device of the system (100) or a connected computing device. In one or more embodiments, the display engine (116) includes a projector of a PIC device.

The display engine (116) may include a 2-dimensional and/or 3-dimensional projector (e.g., a projector or a combination of one or more projectors) that is able to project a digital image onto the AR workspace. The display engine (116) may further include a 2-dimensional display (e.g., a liquid crystal display (LCD), a light emitting diode (LED) display, a cathode ray tube (CRT) display, or a thin film transistor (TFT) display), a 3-dimensional display, or a combination of one or more displays that is able to display an AR overlay. The display engine (116) may operate in an unrestricted color space in visible or non-visible wavelength regimes (e.g., ultraviolet, visible, near infrared, and infrared).

The display engine (116) may project or display an interface, an information block, and/or an indicator block onto the AR workspace to facilitate user interaction with the AR workspace. In a non-limiting example, the interface may include one or more control elements that allow the user to control the size, position, orientation, and content of the virtual x-ray representation (106). In other words, the user may navigate and manipulate the AR workspace using virtual controls without having to reference a separate computing device.

In response to the rendering engine (114) rendering a virtual x-ray representation (106), the display engine (116) may project the virtual x-ray representation (106) as part of an AR overlay in the AR workspace. The virtual x-ray representation (106) may be projected within a predetermined region of the AR workspace. The size, shape, orientation, and position of the virtual x-ray representation (106) may be determined by the display engine (116) or the rendering engine (114).

Although the system (100) is shown as having six components (102, 108, 110, 112, 114, and 116), in other embodiments of the invention, the system (100) may have more or fewer components. Furthermore, the functionality of each component described above may be shared among multiple components or performed by a different component. In addition, each component (102, 108, 110, 112, 114, and 116) may be utilized multiple times in serial or parallel to carry out a repeated operation or an iterative operation.

Figure 2:
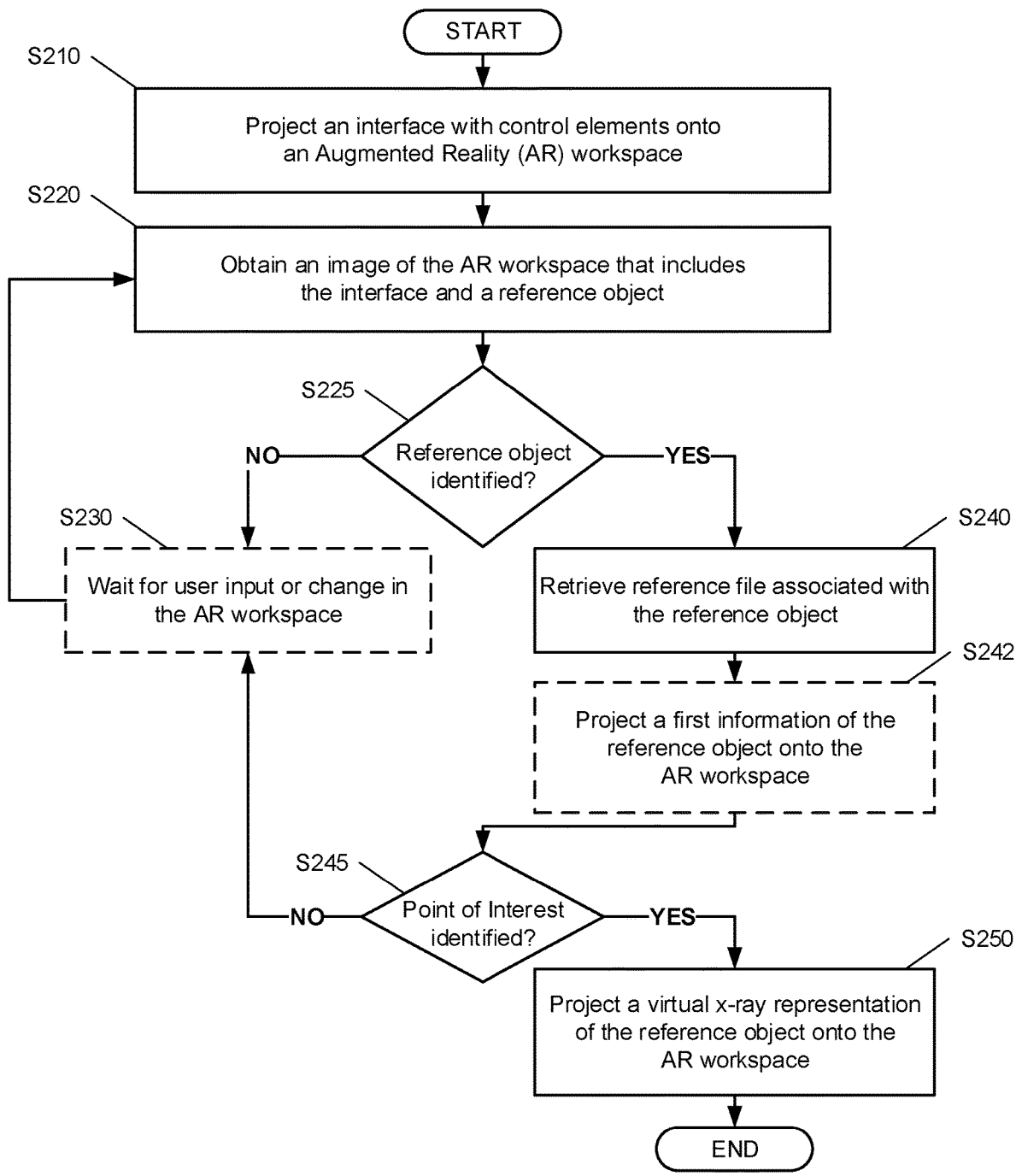
FIG. 2 shows a flowchart in accordance with one or more embodiments of the invention.

FIG. 2 shows a flowchart for visualizing a reference object in an AR workspace in accordance with one or more embodiments of the invention. In a non-limiting example, the user may place a PCB in the AR workspace and wish to visualize an internal structure of the PCB. Thus, the system (100) will obtain an AR workspace image (104) and subsequently generate and project a virtual x-ray representation (106) that includes a visual depiction of the internal structure of the reference object.

At S210, the display engine (116) projects an interface with control elements onto an AR workspace. By including the interface in the AR workspace, parsing of the AR workspace image (104) allows the user to exert control over the AR workspace without diverting attention away from the AR workspace. To project the interface into the interface region of the AR workspace, the system (100) may calibrate the AR workspace by mapping a first coordinate space to the AR workspace. As discussed above, the interface may be generated by the rendering engine (114) and projected by the display engine (116).

At S220, the imaging engine (108) obtains an AR workspace image (104) that includes the interface and the reference object to be visualized (e.g., a multi-layer PCB).

At S225, the system (100) determines whether the reference object in the AR workspace image (104) has been identified by the parsing engine (110). As discussed above, the parsing engine (110) parses the AR workspace image (104) and may automatically identify and extract information from the image. The process of identifying the reference object will be discussed in further detail below with respect to FIG. 3.

When the determination at S225 is NO (i.e., the reference object is not identified by the parsing engine (110)), the process continues with S230.

At S230, the system (100) optionally waits for user input or a change in the AR workspace. For example, the user may manually identify the reference object (e.g., enter the information via a connected computing device) or move/reorient the reference object to provide a different perspective of the reference object that the parsing engine (110) may be able to analyze from a subsequent AR workspace image (104). In one or more embodiments, the imaging engine (108) may automatically obtain a new AR workspace image (104) at periodic intervals. Alternatively, the user may asynchronously trigger the imaging engine (108) (e.g., by physical control, virtual control, or gesture recognized by the parsing engine (110)) to obtain a new AR workspace image (104) when the reference object is repositioned. In one or more embodiments, the system (100) skips S230 and immediately returns to S220 to obtain a new AR workspace image (104) for analysis.

When the determination at S225 is YES (i.e., the reference object is successfully identified by the parsing engine (110)), the process continues with S240. As describe below with respect to FIG. 3, identifying the reference object may include determining a reference file associated with the reference object based on identifying information provided by a user or extracted from the AR workspace image (104).

At S240, the parsing engine (110) retrieves the reference file associated with the reference object to obtain structural information describing one or more structures of the reference object.

At S242, the rendering engine (114) optionally generates an information block describing the reference object and the display engine (116) may project the information block onto the AR workspace. The information block may be separate from or integrated as part of a virtual x-ray representation (106). For example, the information block may present the user with general information (e.g., date, time) or information about the reference object based on the content of the reference file (e.g., filename of the reference file, product name, product type, size, dimensions, etc.)

In one or more embodiments where the information block is a component of the virtual x-ray representation (106), the information block may present the user with specific information describing one or more structures of the reference object. In other words, the virtual x-ray representation (106) may be generated and stored before a specific point of interest on the reference object is identified by the user of the system (100). For example, the virtual x-ray representation (106) may include a two-dimensional or three-dimensional rendering of the entire reference object projected in the information block.

At S245, the system (100) determines whether a point of interest (POI) on the reference object (i.e., a first POI) has been identified in the AR workspace image (104) by the parsing engine (110). As discussed above, the parsing engine (110) may identify a point of interest based on a pointer (e.g., a hand, a finger, a stylus, a pen/pencil, a soldering iron, or any appropriate tool) that has been identify by an image or shape recognition algorithm. The process of identifying a point of interest will be discussed in further detail below with respect to FIG. 4.

When the determination at S245 is NO (i.e., a point of interest is not identified by the parsing engine (110)), the process returns to S230.

When the determination at S245 is YES (i.e., a point of interest is successfully identified by the parsing engine (110)), the process continues with S250.

At S250, the display engine (116) projects a virtual x-ray representation (106) of the reference object onto the AR workspace. As discussed above, the virtual x-ray representation (106) may include or may be independent of an information block. The virtual x-ray representation (106) may include a visual depiction of one or more internal structures of the reference object located at or in the vicinity of the first POI identified by the parsing engine (110).

In addition, rather than stopping at the projection of the virtual x-ray representation (106) onto the AR workspace, the system (100) may repeat the above process from S220 to actively update the virtual x-ray representation (106) as the user interacts with the AR workspace. The system (100) may update the virtual x-ray representation (106) to track the first POI as a user moves a pointer around the reference object. The system (100) may update the virtual x-ray representation (106) based on the user switching a tool used as the pointer. The system (100) may change the virtual x-ray representation (106) to show a new reference object introduced into the AR workspace or switch between multiple reference objects as the user interacts with them.

In one or more embodiments where the reference object is a multi-layer PCB, S250 may include generating and projecting a virtual x-ray representation (106) based on a CAD file comprising structural information for the entire PCB. The virtual x-ray representation (106) may show a plan view, centered on the first POI, of every layer of the PCB. Each layer of the PCB may correspond to one or more virtual layers of the virtual x-ray representation (106). Each virtual layer of the virtual x-ray representation (106) may be color-coded to differentiate between virtual layers and/or to demonstrate relationships between different virtual layers. The virtual x-ray representation (106) may show a plan view of a single layer of the PCB, internal or external, based on a selection input into the interface by the user.

In one or more embodiments, the system (100) may contextually update the virtual x-ray representation (106) based on a tool that the user uses as the pointer (e.g., a stylus, a scribe, a knife, a soldering iron). For example, in the case of a soldering iron, the rendering engine (114) may change the selected structural layer of the reference file to a surface layer that is accessible to the soldering iron and/or may filter the rendering to only show components that may be modified by a soldering iron. Furthermore, the rendering engine (114) may update an information block to include new or different information related to the newly selected tool.

Figure 3:
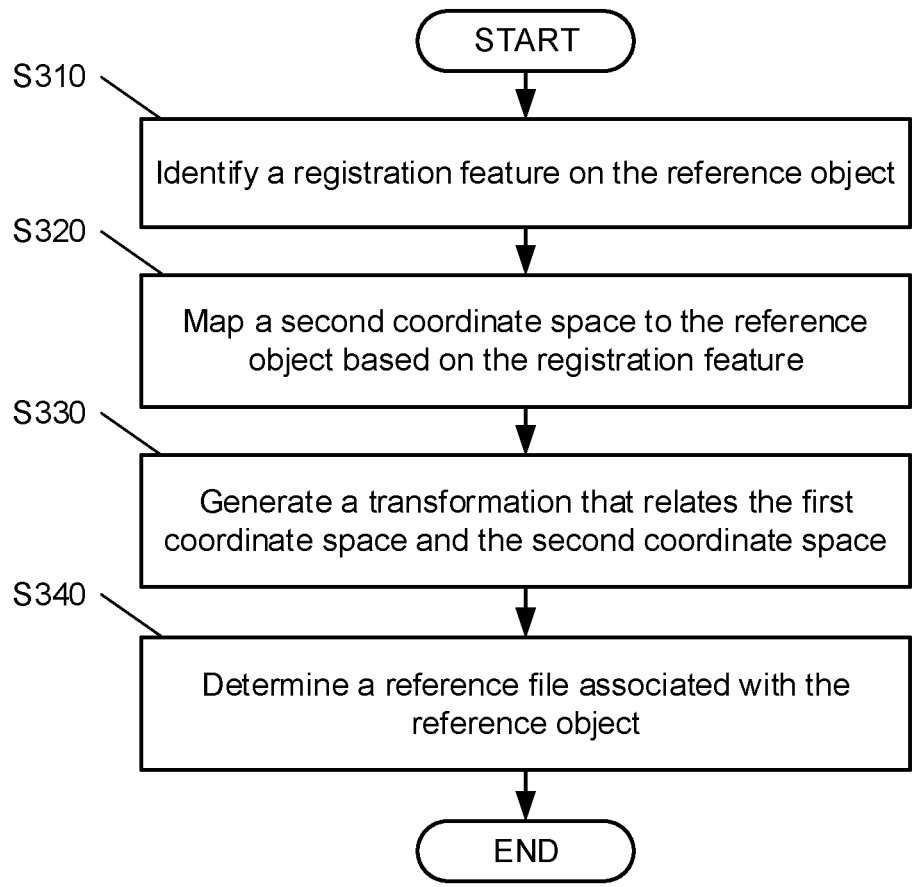
FIG. 3 shows a flowchart in accordance with one or more embodiments of the invention.

FIG. 3 shows a flowchart for identifying the reference object in the AR workspace in accordance with one or more embodiments of the invention.

At S310, the parsing engine (110) identifies a registration feature on the reference object using an image recognition algorithm. The registration feature may be any identifying information or visual landmark on the reference object. In one or more embodiments where the reference object is a multi-layer PCB, the registration feature may be any identifying information disposed on the PCB (e.g., a label, a barcode, a symbol/logo) or any structural landmark on the PCB (e.g., an edge, an electronic component, a conductive trace, a through-hole).

At S320, the parsing engine (110) maps a second coordinate space to the reference object based on the registration feature. Because the second coordinate space is based on the registration feature of the reference object, the second coordinate space may be consistent with a coordinate space used by a reference file. In one or more embodiments where the reference file is a CAD file, the second coordinate space may define a local origin consistent with a conventional origin in a CAD processing program (e.g., at a corner or at the center of the reference object).

At S330, the parsing engine (110) generates a transformation that relates the first coordinate space and the second coordinate space. By relating the first and second coordinate spaces with a transformation or a transformation set (H), the system (100) may directly relate location information in the AR workspace (e.g., a pointer location) to a relative location on the reference object. Subsequently, the relative location on the reference object may be used to identify relevant information in a reference file. For example, in the non-limiting example of a CAD reference file, when the pointer in the first coordinate system overlaps a portion of the reference object, the transformation engine (112) may calculate a point of interest in the second coordinate system (i.e., in the coordinate system of the CAD file) based on the transformation.

At S340, the parsing engine (110) determines a reference file associated with the reference object. As discussed above, the parsing engine (110) may determine the reference file (e.g., a computer aided design file, a diagnostic results file, a manufacturing report, an invoice, etc.) associated with the reference object based on identifying information extracted from the AR workspace image (104). Alternatively, the parsing engine (110) may identify the reference file based on information provided by the user.

In one or more embodiments where the reference object is a PCB, the parsing engine (110) may identify the PCB based on a registration feature, identifying information on the surface of the PCB (e.g., printed text, an applied label, a computer readable code such as barcode or QR code), a shape of the PCB, an arrangement of components disposed on the PCB, or any combination thereof. For example, the registration feature may be the identifying information on the surface of the PCB or any structural landmark on the PCB. Furthermore, the parsing engine (110) may determine a reference file associated with the PCB (e.g., a computer aided design file, a diagnostic results file, a manufacturing report, an invoice, etc.) based on registration feature or identifying information extracted from the AR workspace image (104).

Figure 4:
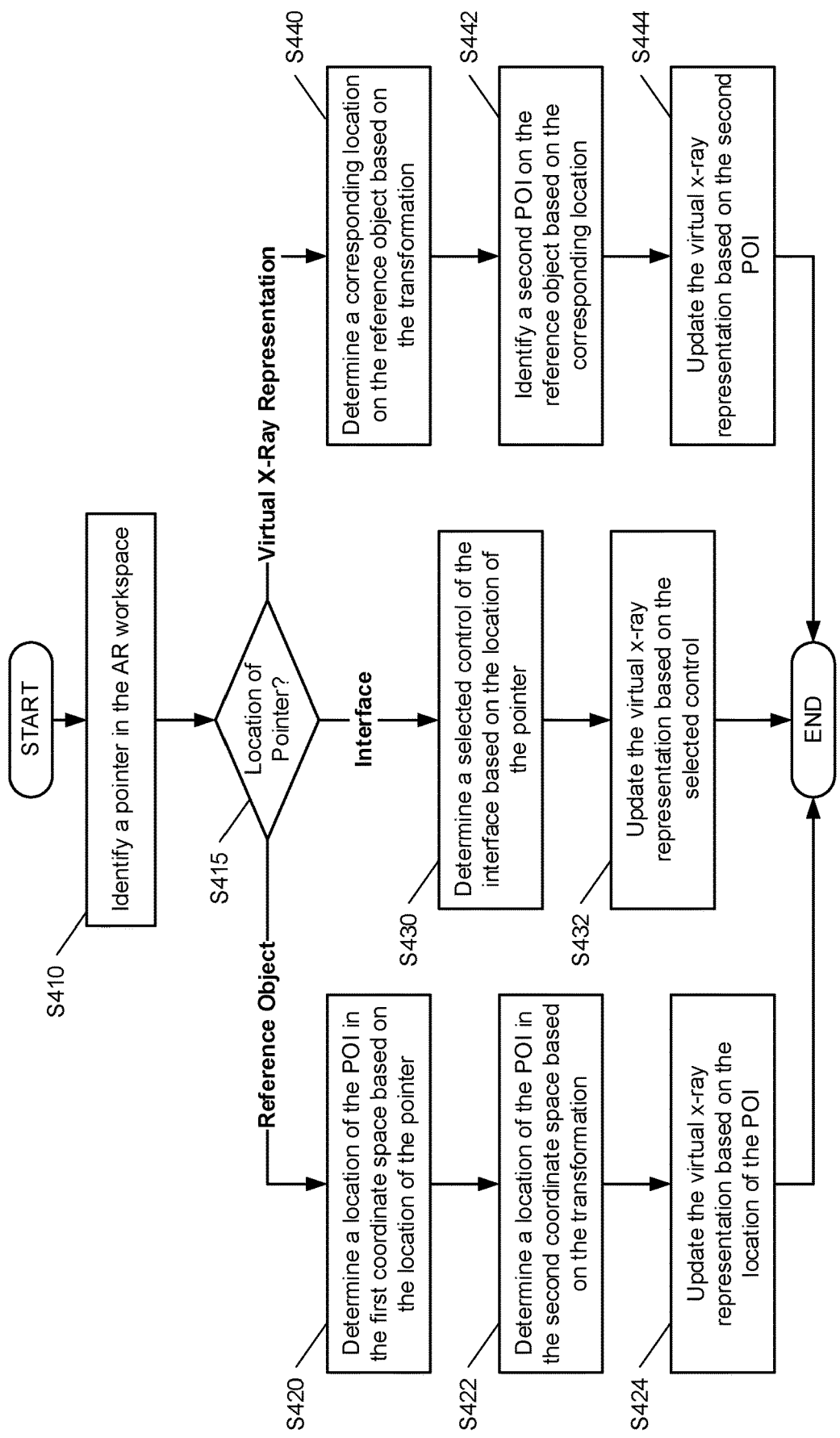
FIG. 4 shows a flowchart in accordance with one or more embodiments of the invention.

FIG. 4 shows a flowchart for identifying a point of interest in the AR workspace, in accordance with one or more embodiments of the invention. In a non-limiting example, the user may use one or more pointers to interact with the AR workspace. As discussed above, a pointer may be a hand, a finger, a stylus, a pen/pencil, a soldering iron, or any appropriate tool for indicating a point of interest in the AR workspace. Based on the location of each pointer and its associated point of interest, the user may input a control command to the system (100) and/or the system (100) may update the virtual x-ray representation (106). In one or more embodiments, multiple branches of FIG. 4 may be performed simultaneously or sequentially to generate/update a virtual x-ray representation (106).

At S410, the parsing engine (110) identifies one or more pointers in the AR workspace. The parsing engine (110) may use an image recognition algorithm to identify and locate each pointer within an AR workspace image (104). The parsing engine (110) may identify a point of interest (POI) associated with each pointer.

At S415, the parsing engine (110) determines a location of each pointer in one or more coordinate spaces based on the transformation set (H). The parsing engine (110) may categorize the location of the pointer based on an interface region, a reference region, and a projection region of the AR workspace. Although the process is shown as having three distinct branches, in other embodiments of the invention, the process may have more or fewer branches. Furthermore, the processes of each branch described below may be shared among multiple branches or performed by a different branch. As discussed above, each branch may be utilized multiple times in serial or parallel to carry out a repeated operation or an iterative operation.

When the parsing engine determines the location of the pointer to be in the reference region (e.g., overlapping or in the vicinity of the reference object), the process continues with S420.

At S420, the parsing engine (110) determines a location of the POI in the first coordinate space based on the location of the pointer. In one or more embodiments, the parsing engine (110) may locate the POI at a predetermined offset from the pointer to improve visibility for the user.

At S422, the parsing engine (110) determines a location of the POI in the second coordinate space based on the transformation set (H). Because the second coordinate space is based on the geometry of the reference object, the location of the POI may further be correlated with a coordinate space used by the reference file.

At S424, the system (100) updates the virtual x-ray representation (106) based on the location of the POI. For example, the parsing engine (110) may retrieve, from the reference file, information regarding the structures of the reference object based on the location of the POI in the second coordinate space. The rendering engine (114) may update the virtual x-ray representation (106) and display engine (116) may project the updated representation into the AR workspace. In one or more embodiments, the updated virtual x-ray representation (106) may be synchronized with a pointer that the user moves around the reference object (e.g., when the user tracks an electrical trace along the surface of a PCB).

When the parsing engine determines the location of the pointer to be in the interface region (e.g., overlapping or in the vicinity of the interface), the process continues with S430.

At S430, the parsing engine (110) determines a selected control of the interface based on the location of the pointer.

At S432, the system (100) updates the virtual x-ray representation (106) based on the selected control. For example, the selected control changes one or more layers of the reference file that are rendered for display in the virtual x-ray representation (106). The selected control may change a size, color palette, orientation, magnification, or any combination thereof of one or more renderings in the virtual x-ray representation (106). The selected control may freeze the virtual x-ray representation (106) such that the user may freely move about the AR workspace without disrupting the virtual x-ray representation (106). However, the controls are not limited to the examples described herein and any appropriate control over the AR workspace may be used.

When the parsing engine determines the location of the pointer to be in the projection region (e.g., overlapping or in the vicinity of the virtual x-ray representation (106)), the process continues with S440.

At S440, the parsing engine (110) determines a corresponding location on the reference object based on the location of the pointer in the AR workspace and the transformation set (H). In other words, the user may use a pointer to indicate a location within the virtual x-ray representation (106) which the system (100) may identify based on the known content of the virtual x-ray representation (106). By using the transformation set (H), the parsing engine (110) may relate a location of the pointer in projection region (i.e., in the first coordinate space) with the corresponding location of the reference object (i.e., in the second coordinate space).

At S442, the parsing engine (110) identifies a second POI on the reference object based on the corresponding location. In one or more embodiments, second POI is located within the first POI that is rendered in the original virtual x-ray representation (106).

At S424, the system (100) updates the virtual x-ray representation (106) based on the second POI. For example, the parsing engine (110) may retrieve, from the reference file, information regarding the structures of the reference object based on the location of the second POI in the second coordinate space. The rendering engine (114) may update the virtual x-ray representation (106) and display engine (116) may project the updated representation into the AR workspace.

In one or more embodiments, the updated virtual x-ray representation (106) may include additional information regarding the second POI (e.g., an information block describing a structure located at the second POI). For example, the additional information may include a connecting line between a feature rendered in the virtual x-ray representation (106) and the corresponding feature on the physical reference object (e.g., an indicator block that correlates the position of the pointer in the AR workspace with the second POI on the reference object). Alternatively, or in addition, the indicator block may visually correlate an information block with the reference object and/or the virtual x-ray representation (106).

FIGS. 5A-5H show implementation examples of a virtual x-ray representation (106) in accordance with one or more embodiments of the invention.

Figure 5A:
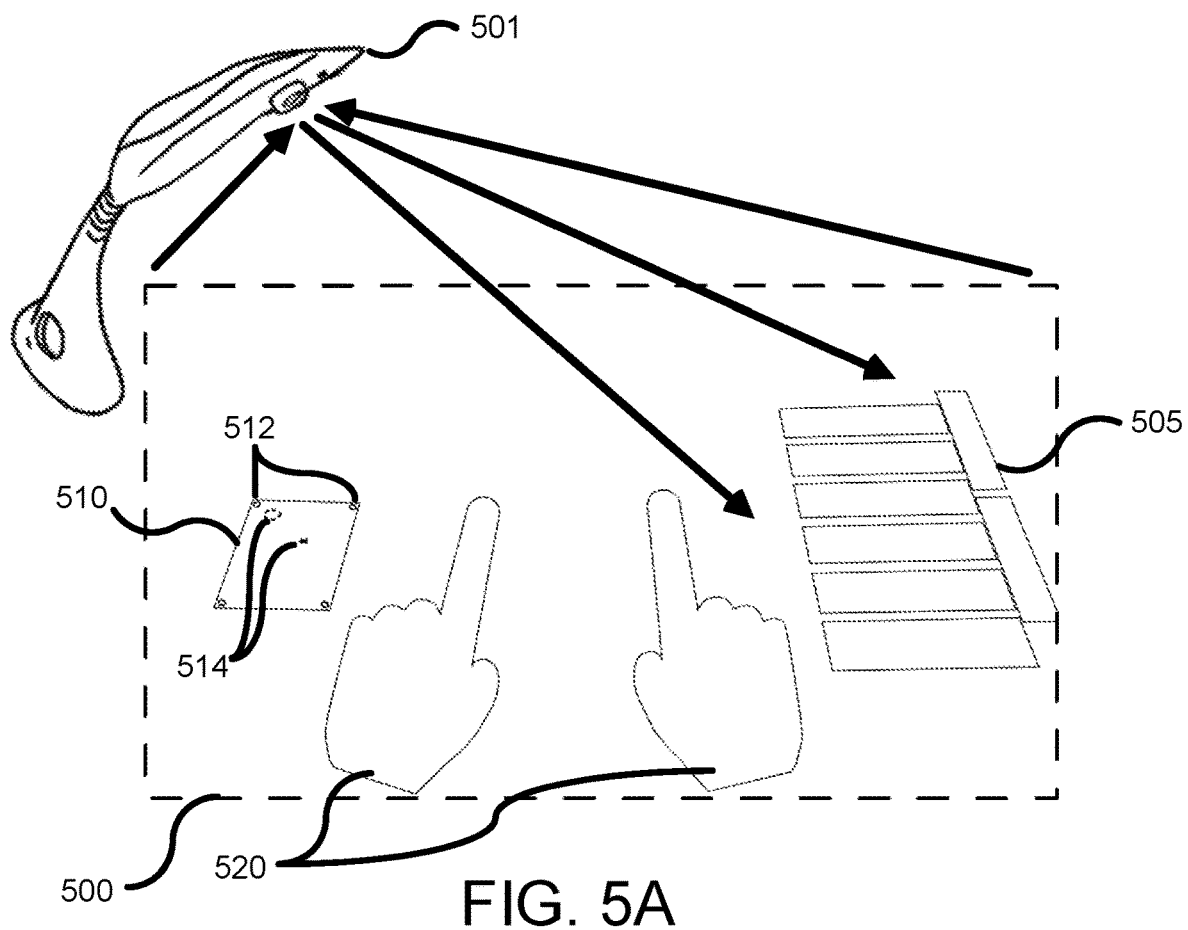
FIGS. 5A-5H show implementation examples in accordance with one or more embodiments of the invention.

FIG. 5A shows a system (100) that includes an AR workspace (500) and a Projection with Interactive Capture (PIC) device (501). The PIC device (501) includes a camera that obtains images of the AR workspace (500) and a projector that projects an AR overlay onto a surface of the AR workspace (500). The imaging engine (108) includes the camera of the PIC device (501). The display engine (116) includes the projector of the PIC device (501). The display engine (116) may further include a display or output device of a connected computing device.

The PIC device (501) may further comprise a mat (not shown) that functions as the surface of the AR workspace (500). The mat may have a matte surface to minimize reflections/glare and improve the quality (e.g., contrast and brightness) of an AR workspace image (104) obtained by the PIC device (501). The mat may be plastic, vinyl, or any appropriate material for a work surface. However, the PIC device (501) may not include a mat and may use any surface as the AR workspace (500).

The PIC device (501) projects an AR overlay including an interface (50) onto the AR workspace (500), as shown by the arrows emitted from the PIC device (501). Furthermore, the PIC device (501) captures an AR workspace image (104) that may include: the AR workspace (500); an interface (505); a PCB (510) (i.e., the reference object); and one or more pointers (520) (e.g., the user's hands).

The interface (505) includes a plurality of control elements (e.g., virtual buttons) that the use may interact with by moving a pointer (52) to the interface (505) and touching the surface of the AR workspace (500) at the location of the control element. For example, a virtual control element may be activated by a pressure sensor embedded in the surface of the AR workspace (500) or by a depth sensor included in the imaging engine (108) of the PIC device (501).

The PCB (510) may be a multi-layer PCB with a plurality of registration features (512) and structures (514) disposed on one or more external surfaces or internal layers. The camera of the PIC device (501) may capture an AR workspace image (104) with sufficient resolution to identify registration features (512) and structures (514) of the PCB (510) using image recognition techniques. In one or more embodiments, the registration features (512) may be through-holes disposed at corners of the PCB (510) and the structures (514) may be surface mounted components (e.g., conductive traces, passive electronic components, active electronic components, etc.) or embedded components (e.g., conductive traces, interlayer vias, embedded components, etc.) of the PCB (510).

Figure 5B:
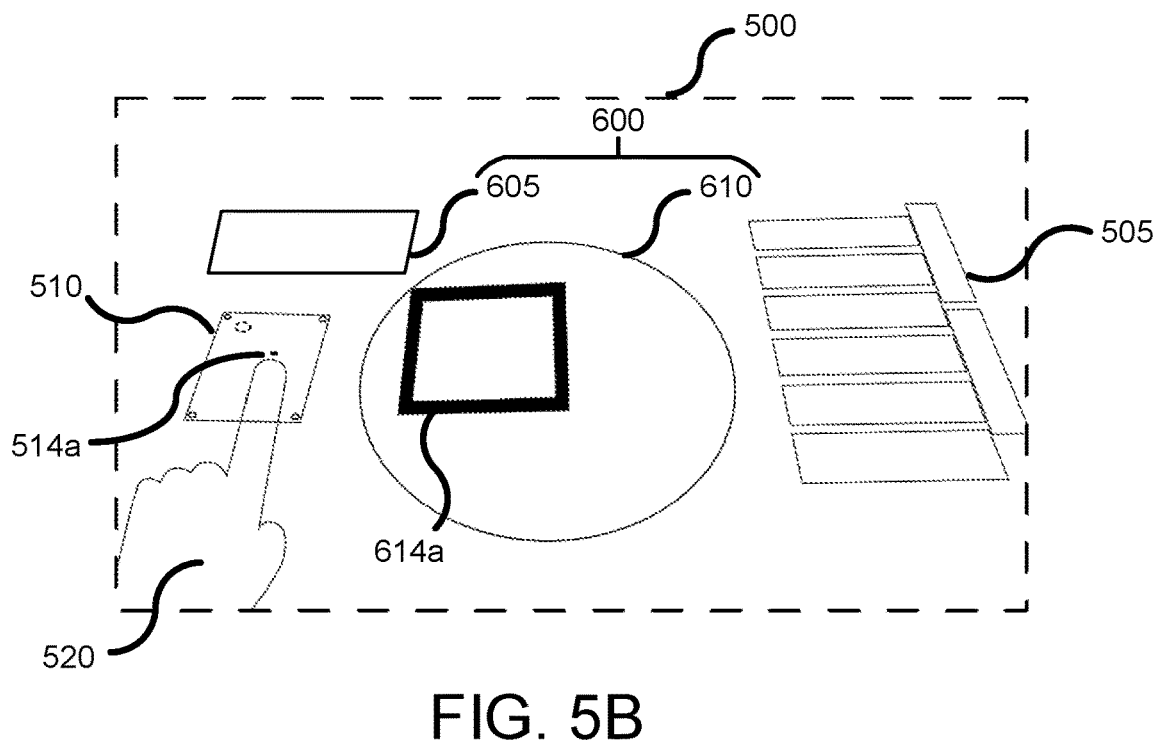

FIG. 5B shows an AR workspace (500) of FIG. 5A with an AR overlay (600). The AR overlay (600) includes an information block (605) and a virtual x-ray representation (610) based on the pointer (520) located on the PCB (510). For example, the user may use a finger (i.e., pointer (520)) to indicate structure (514a) as a first point of interest (POI) in the AR workspace (500). The system (100) generates the AR overlay (600) with an information block (605) that describes the PCB (510) and with a virtual x-ray representation (610) based on the first POI. The virtual x-ray representation (610) may include a magnified view of a layer of the PCB (510) centered at the first POI. The magnified view may be generated based on a CAD file with the electronics layout of the PCB (510) (i.e., a reference file). The virtual x-ray representation (610) includes a rendering (614a) with a magnified view of structure (514) and the surrounding region of the PCB (510) included in the first POI.

Figure 5C:
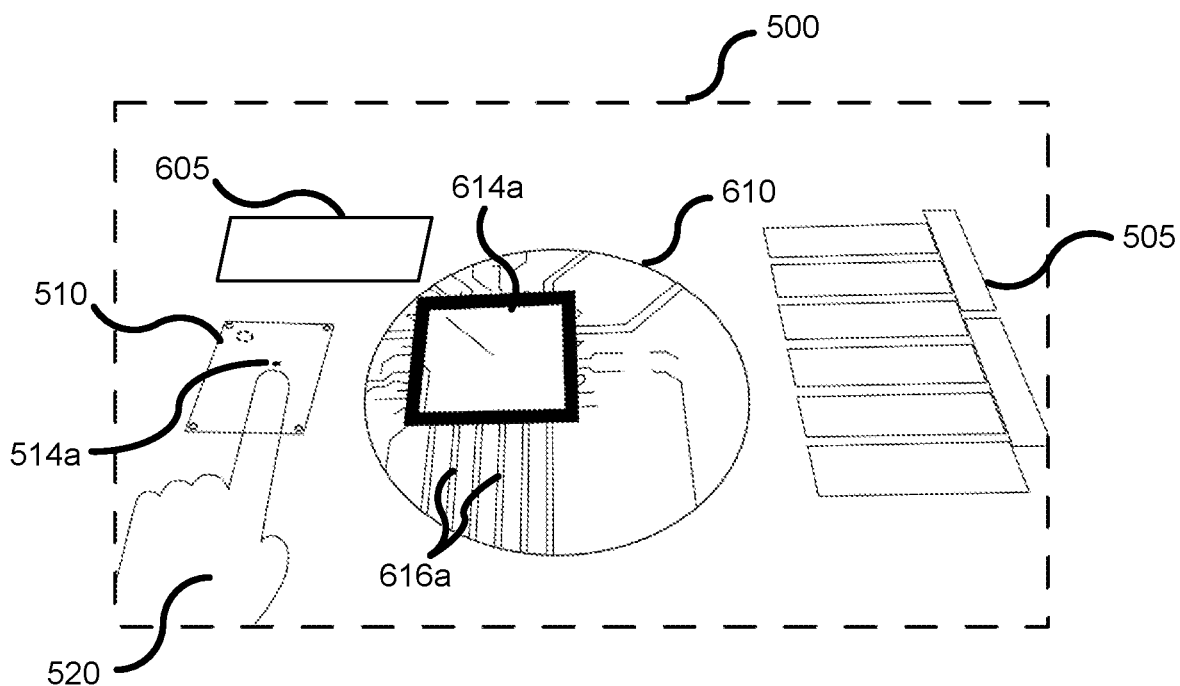

FIG. 5C shows the AR workspace (500) of FIG. 5B with an updated virtual x-ray representation (610). The rendering engine (114) may render the virtual x-ray representation (610) with one or more virtual layers depicting a rendering (614a) of structure (514a) and a rendering (616a) of other related structures (e.g., conductive traces) on PCB (510). For example, the virtual x-ray representation (610) may further include a rendering (616a) with a magnified view of conductive traces that are connected to the structure (514a). In one or more embodiments, the information block (605) may be updated to display information regarding the conductive traces (e.g., critical traces that should not be damaged, traces with an abnormality detected during diagnostic testing, traces that need to be repaired, etc.).

In one or more embodiments, rendering (614a) and rendering (616a) may be based on a single layer of the reference CAD file. For example, the original virtual x-ray representation (610) of FIG. 5B may have been filtered to exclude renderings of conductive traces on the same physical layer as the structure (514a) to simplify the visual depiction of the PCB (510) for the user. The updated virtual x-ray representation (610) of FIG. 5C, without the filter, renders all structures on the selected layer of PCB (510). In other words, the content of the virtual x-ray representation (610) may be adapted to include multiple virtual layers (i.e., filters) based on the needs of the user. The virtual layers of the virtual x-ray representation (610) may be distinguished by color palette, opacity, patterns, any combination thereof, or any appropriate visual indicator.

Figure 5D:
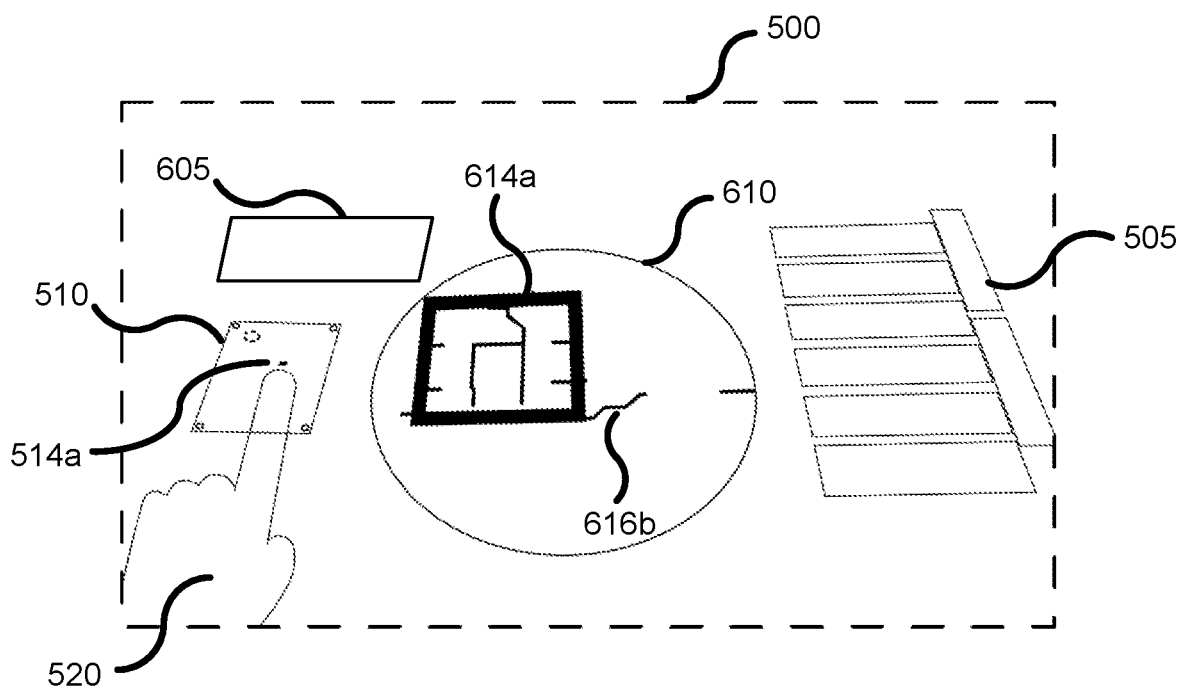

FIG. 5D shows the AR workspace (500) of FIG. 5B with another type of updated virtual x-ray representation (610). In one or more embodiments, the updated virtual x-ray representation (610) includes a rendering (614a) of the structure (514) located on a first layer of the PCB (510) and a rendering (616b) of conductive traces located on a second layer of the PCB (510).

Figure 5E:
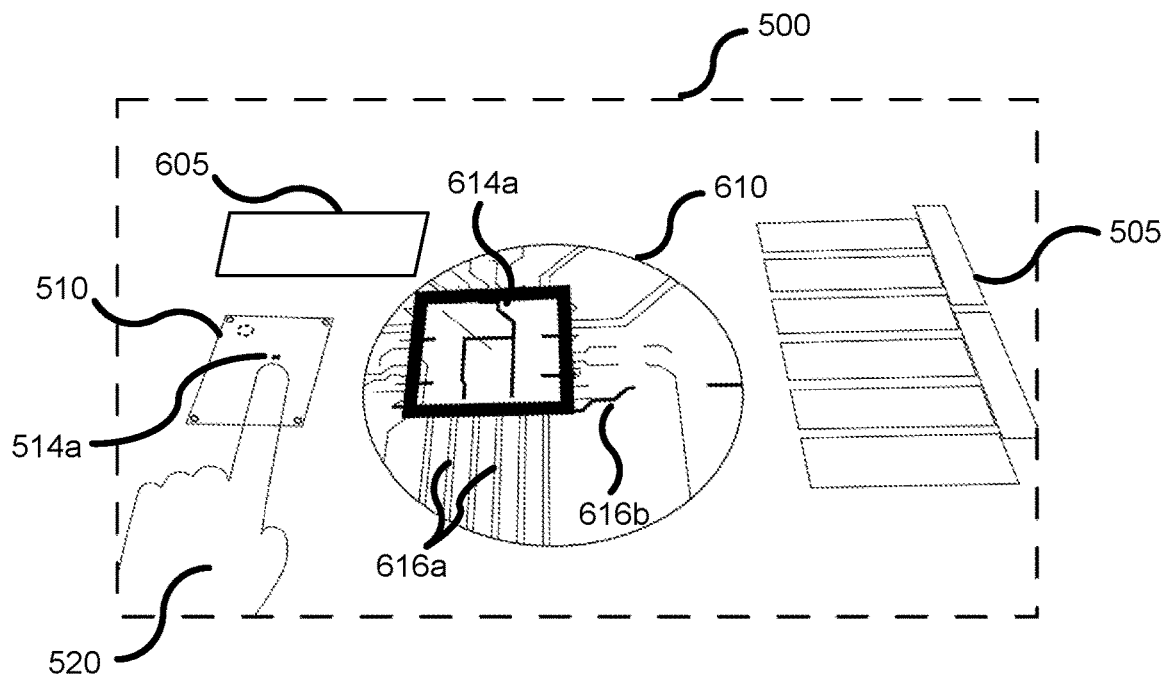

FIG. 5E shows the AR workspace (500) of FIG. 5B with another type of updated virtual x-ray representation (610) that uses multiple virtual layers of the virtual x-ray representation (610) to depict multiple layers and multiple filtered subsets of structures on the PCB (510).

Figure 5F:
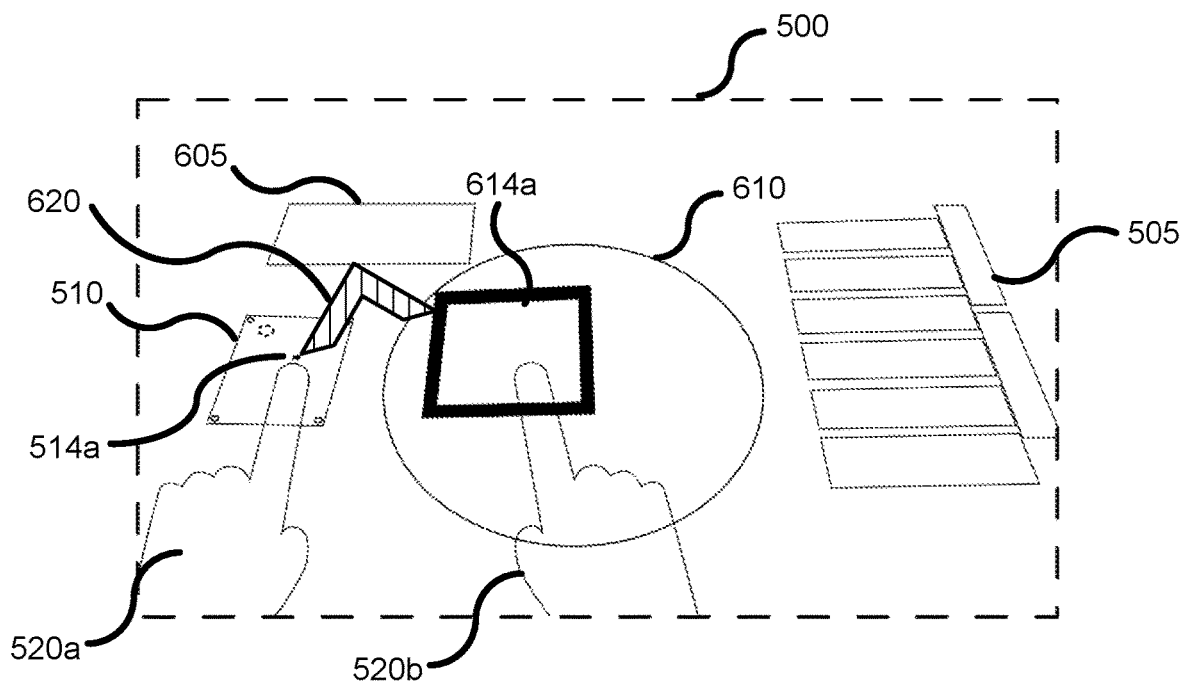

FIG. 5F shows the AR workspace (500) of FIG. 5B with another type of updated virtual x-ray representation (610). In one or more embodiments, the x-ray representation (610) may be used as an input to update the virtual x-ray representation (610). As in FIG. 5B, a first POI on PCB (510) is indicated by a first pointer (520a) to generate the original AR overlay (600) including an information block (605) and a virtual x-ray representation (610) with rendering (614a). The user may require more information about the structure (514a) represented by the rendering (614a) and may use a second pointer (520b) to indicate the rendering (614a) in the projection region of the AR workspace (500). The parsing engine (110) identifies and locates the second pointer (520a) and determines a corresponding location on the PCB (510) based on the location of the second pointer (520a) in the first coordinate space of the AR workspace (500) and the transformation set (H) related to the second coordinate space of the PCB (510). Based on the second pointer (520a) in the virtual x-ray representation (610), the parsing engine (110) may identify a second POI on the reference object based on the corresponding location, where the second POI is located within the first POI. The virtual x-ray representation (610) may be updated to include an indicator block that correlates the location of the second pointer (520a) in the first coordinate space with the second POI located at the corresponding location on the PCB (510).

Figure 5G:
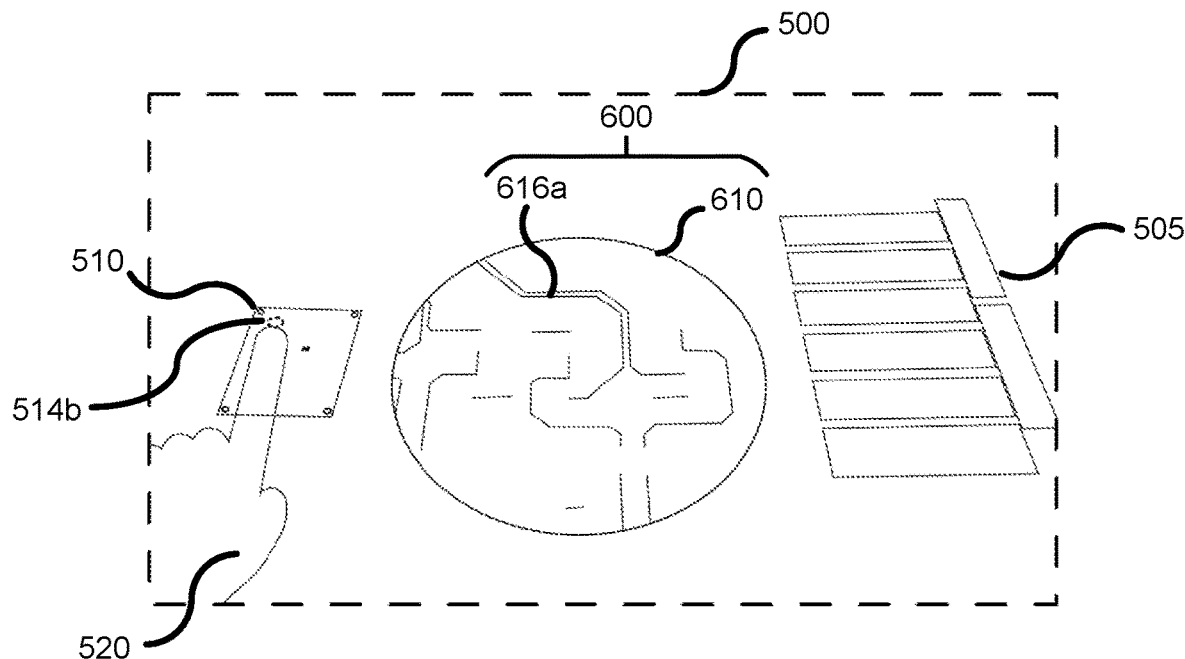

FIG. 5G shows an AR workspace (500) of FIG. 5A with another AR overlay (600). The AR overlay (600) includes a virtual x-ray representation (610) based on the pointer (520) indicating an embedded structure (514b) on the PCB (510). The virtual x-ray representation (610) may include a magnified view of a layer of the PCB (510) generated based on the CAD file with the electronics layout of the PCB (510) (i.e., a reference file). Further, the virtual x-ray representation (610) includes a rendering (616a) of embedded conductive traces located on an internal layer of the PCB (510).

Figure 5H:
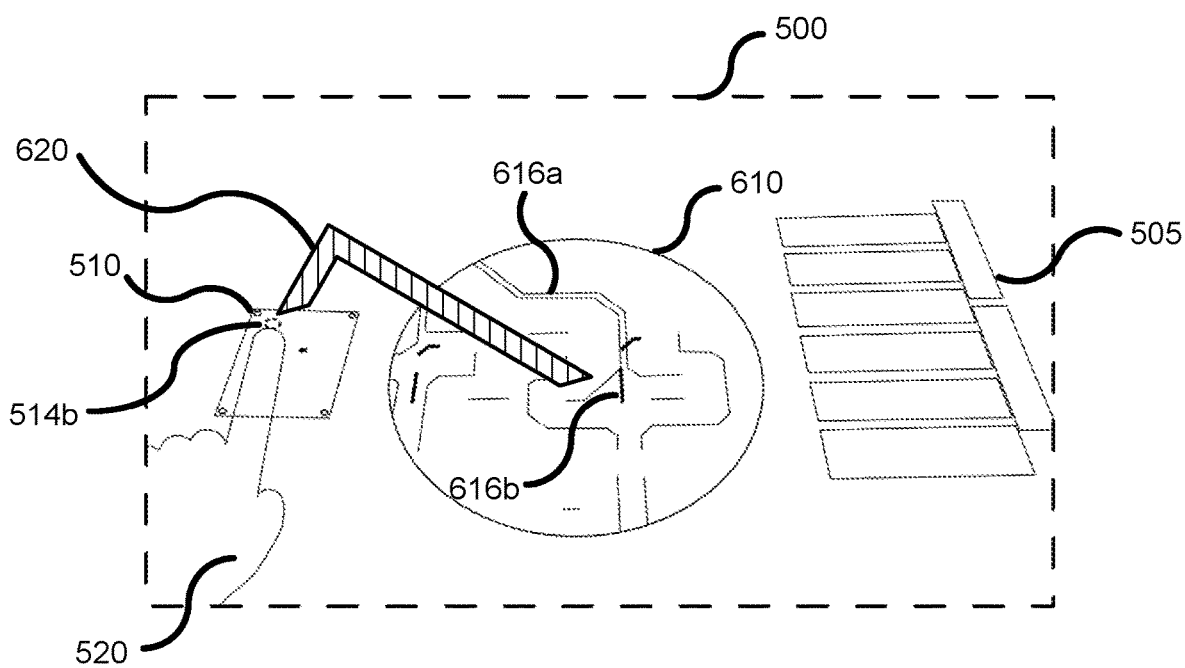

FIG. 5H shows the AR workspace (500) of FIG. 5G with an updated virtual x-ray representation (610) that uses multiple virtual layers of the virtual x-ray representation (610) to depict multiple layers of information regarding the embedded structures (514b) on the PCB (510). The user may require more diagnostic information about the embedded structures (514b) represented by the rendering (616a) and may command the system (100) to visually highlight any abnormal structures (e.g., shorted conductive traces, defective components, etc.) in the region indicated by pointer (520). Based on the location of the pointer (520) in the second coordinate space of the PCB (510), the parsing engine (110) may identify a diagnostic file/dataset (e.g., bed-of-nail test report, visual inspection report, manufacturing statistics) associated with the PCB (510) and extract information identifying abnormal structures near embedded structures (514b). For example, the reference file may include the CAD file with the electronics layout of the PCB (510) and the diagnostic report.

In one or more embodiments, the diagnostic report may include a list of regions with statistically higher rates of failure. Accordingly, the updated virtual x-ray representation (610) may be updated with renderings (616b) of the problematic regions, an information block (not shown) describing the failures, and/or the indicator block (620) to associate the rendering (616b) with highlighted failure regions projected onto the PCB (510).

In one or more embodiments, the diagnostic report may include identified failure points for the specific PCB (510). The virtual x-ray representation (610) may be updated to include an additional virtual layer with a rendering (616b) of the failure points and/or locations to make modification to the PCB (510) to circumvent the failure points. As discussed above, the system (100) may also provide additional contextual information based on objects recognized by the parsing engine (110). For example, if a soldering iron (not shown) is introduced into the AR workspace (500) as a second pointer, parsing engine (110) may identify the soldering iron and instruct the rendering engine (114) to update the virtual x-ray representation (610) with a route to solder a bypass wire around an abnormal conductive trace or defective component. Alternatively, if a scribe or blade (not shown) is introduced into the AR workspace (500) as a second pointer, parsing engine (110) may identify the cutting tool and instruct the rendering engine (114) update the virtual x-ray representation (610) with locations to cut an abnormal conductive trace. Further, the virtual x-ray representation (610) may be updated to include an indicator block (620) to associate the rendering (616b) with a highlighted region projected onto the PCB (510) to indicate a location of the corrective modifications.

The parsing engine (110) determines a corresponding location on the PCB (510) based on the location of the second pointer (520a) in the first coordinate space of the AR workspace (500) and the transformation set (H) related to the second coordinate space of the PCB (510). Based on the second pointer (520a) in the virtual x-ray representation (610), the parsing engine (110) may identify a second POI on the reference object based on the corresponding location, where the second POI is located within the first POI. The virtual x-ray representation (610) may be updated to include an indicator block that correlates the location of the second pointer (520a) in the first coordinate space with the second POI located at the corresponding location on the PCB (510).

Figure 6:
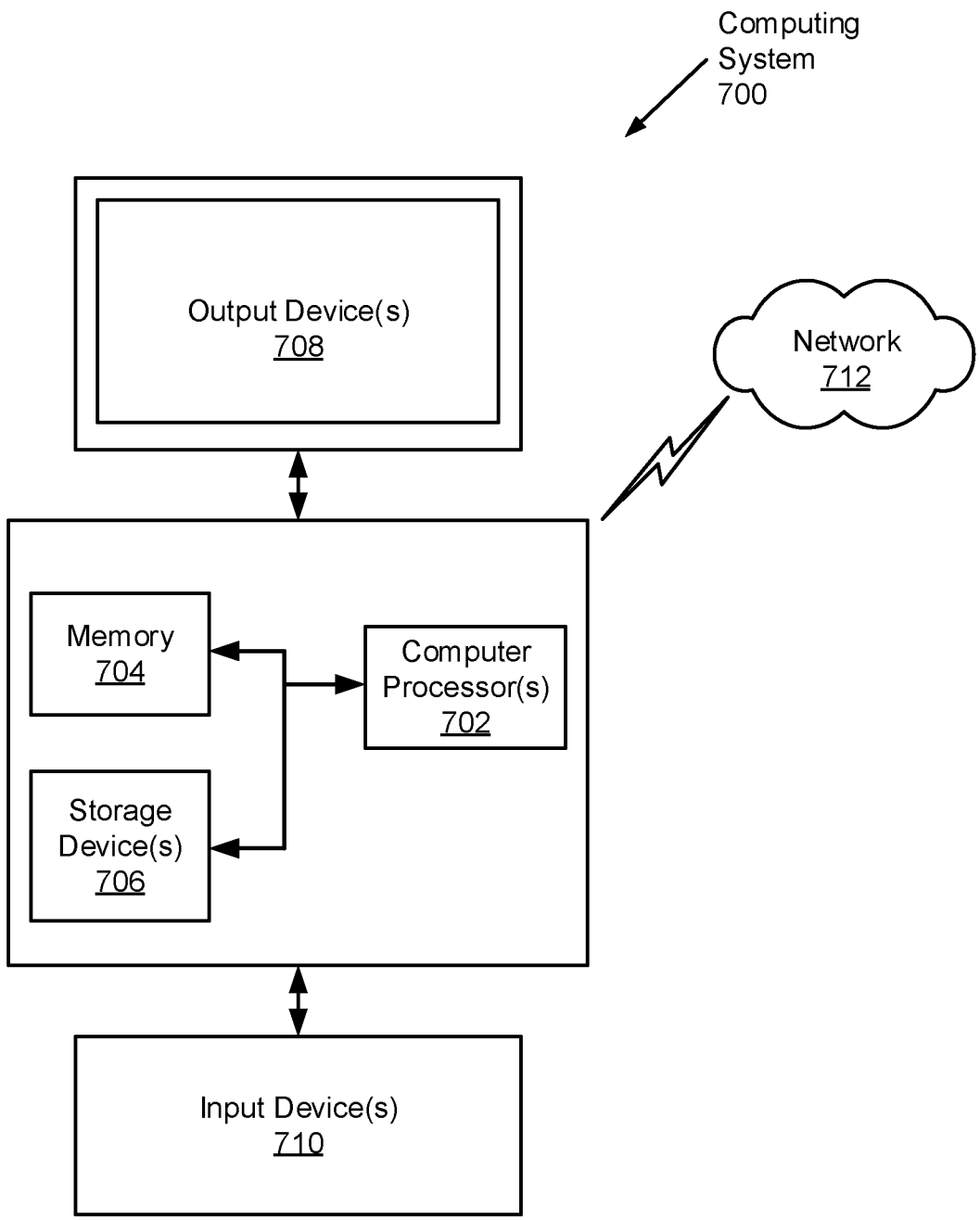
FIG. 6 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6 the computing system (700) may include one or more computer processor(s) (702), associated memory (704) (e.g., random access memory (RAM), cache memory, flash memory), one or more storage device(s) (706) (e.g., a hard disk, an optical drive such as a compact disk (CD) drive or digital versatile disk (DVD) drive, a flash memory stick), and numerous other elements and functionalities. The computer processor(s) (702) may be an integrated circuit for processing instructions. For example, the computer processor(s) may be one or more cores, or microcores of a processor. The computing system (700) may also include one or more input device(s) (710), such as a PIC device, camera, imager, touchscreen, keyboard, mouse, microphone, touchpad, electronic pen, or any other type of input device. Further, the computing system (700) may include one or more output device(s) (708), such as a PIC device, a projector, a screen (e.g., a liquid crystal display (LCD), a plasma display, touchscreen, cathode ray tube (CRT) monitor, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and be connected to the other elements over a network (712).

Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Embodiments of the invention may have one or more of the following advantages: the ability to visualize internal structure of a reference object without destructive testing methods or expensive equipment (x-ray scanners); the ability to project an AR overlay that provides structural information in the same tactile environment as a reference object rather than on a separate computer monitor; the ability to visualize diagnostic information and failure location on a faulty PCB in any environment (e.g., a work/repair station equipped with a PIC device or part of a PIC device); the ability to manipulate the internal visualization of the reference object in a real-world environment, with or without a separate computing system; the ability to rapidly and contextually convey diagnostic information to expedite visual inspection and/or repair of PCB s.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for visualizing a reference object in an augmented reality (AR) workspace, the method comprising:
    calibrating the AR workspace by mapping a first coordinate space to the AR workspace;
    projecting an interface with control elements onto the AR workspace;
    obtaining an image of the AR workspace that includes the interface and the reference object;
    identifying the reference object in the image using an image recognition algorithm;
    retrieving a reference file associated with the reference object, where the reference file includes structural information describing one or more layers of the reference object;
    identifying a first point of interest (POI) on the reference object;
    generating, based on the structural information of the reference file, a virtual x-ray representation of structures of the reference object located at the first POI;
    projecting the virtual x-ray representation onto the AR workspace, wherein
    the virtual x-ray representation includes a rendering of an internal structure of the reference object at the first POI.

2. The method of claim 1, wherein
    the identifying of the reference object includes:
        identifying a registration feature on the reference object using the image recognition algorithm;
        mapping a second coordinate space to the reference object based on the registration feature;
        generating a transformation that relates the first coordinate space and the second coordinate space; and
        determining the reference file associated with the reference object based on identifying information provided by a user or extracted from the image.

3. The method of claim 2, wherein
the identifying of the first POI includes:
identifying a first pointer that is located on the reference object;
determining a location of the first POI in the first coordinate space based on the location of the first pointer; and
determining a location of the first POI in the second coordinate space based on the transformation;
retrieving, from the reference file, information regarding the structures of the reference object based on the location of the first POI in the second coordinate space.

4. The method of claim 3, further comprising:
identifying a second pointer that is located in a region containing the virtual x-ray representation;
determining, for the second pointer, a corresponding location on the reference object based on a location of the second pointer in the first coordinate space and the transformation;
identifying a second POI on the reference object based on the corresponding location, where the second POI is located within the first POI; and
updating the virtual x-ray representation with information regarding the second POI.

5. The method of claim 4, wherein
the virtual x-ray representation is updated to include an information block describing structures associated with the second POI.

6. The method of claim 4, wherein
the virtual x-ray representation is updated to include an indicator block that correlates the location of the second pointer in the first coordinate space with the corresponding location on the reference object.

7. The method of claim 3, further comprising:
identifying a second pointer in the AR workspace that is located in a region of the interface;
determining a selected control from the control elements of the interface based on a location of the second pointer in the first coordinate space; and
updating the virtual x-ray representation based on the selected control.

8. The method of claim 7, wherein
the reference object is a printed circuit board (PCB),
the selected control determines which internal layer of the PCB to include in the virtual x-ray representation.

9. The method of claim 1, wherein
the reference object is a printed circuit board (PCB),
the reference file includes diagnostic information that identifies an abnormal structure on the PCB,
the first POI includes the abnormal structure, and
the virtual x-ray representation further includes a highlighted region that overlaps the PCB in the AR workspace to indicate a location of the abnormal structure on the PCB.

10. The method of claim 1, wherein
the image of the AR workspace is obtained with a Projection with Interactive Capture (PIC) device that comprises a camera and a projector, and
the virtual x-ray representation is projected into the AR workspace by the projector.

11. A non-transitory computer readable medium (CRM) storing computer readable program code for visualizing a reference object in an augmented reality (AR) workspace, the computer readable program code causes a computer to:
calibrate the AR workspace by mapping a first coordinate space to the AR workspace;
project an interface with control elements onto the AR workspace;
obtain an image of the AR workspace that includes the interface and the reference object;
identify the reference object in the image using an image recognition algorithm;
retrieve a reference file associated with the reference object, where the reference file includes structural information describing one or more layers of the reference object;
identify a first point of interest (POI) on the reference object;
generate, based on the structural information of the reference file, a virtual x-ray representation of structures of the reference object located at the first POI;
project the virtual x-ray representation onto the AR workspace, wherein
the virtual x-ray representation includes a rendering of an internal structure of the reference object at the first POI.

12. The non-transitory CRM of claim 11, wherein
to identify the reference object, the computer readable program code causes the computer to:
identify a registration feature on the reference object using the image recognition algorithm; and
map a second coordinate space to the reference object based on the registration feature;
generate a transformation that relates the first coordinate space and the second coordinate space; and
determine the reference file associated with the reference object based on identifying information provided by a user or extracted from the image.

13. The non-transitory CRM of claim 12, wherein
to identify the first POI, the computer readable program code causes the computer to:
identify a first pointer that is located on the reference object;
determine a location of the first POI in the first coordinate space based on the location of the first pointer; and
determine a location of the first POI in the second coordinate space based on the transformation;
retrieve, from the reference file, information regarding the structures of the reference object based on the location of the first POI in the second coordinate space.

14. The non-transitory CRM of claim 13, wherein the computer readable program code causes the computer to:
identify a second pointer in the AR workspace that is located in a region containing the virtual x-ray representation;
determine, for the second pointer, a corresponding location on the reference object based on a location of the second pointer in the first coordinate space and the transformation;
identify a second POI on the reference object based on the corresponding location, where the second POI is located within the first POI; and
update the virtual x-ray representation with information regarding the second POI.

15. The non-transitory CRM of claim 14, wherein the computer readable program code causes the computer to update the virtual x-ray representation by including an information block describing structures associated with the second POI.

16. The non-transitory CRM of claim 14, wherein the computer readable program code causes the computer to update the virtual x-ray representation by including an indicator block that correlates the location of the second pointer in the first coordinate space with the corresponding location on the reference object.

17. The non-transitory CRM of claim 13, wherein the computer readable program code causes the computer to:
    identify a second pointer in the AR workspace that is located in a region of the interface;
    determine a selected control from the control elements of the interface based on a location of the second pointer in the first coordinate space; and
    update the virtual x-ray representation based on the selected control.

18. The non-transitory CRM of claim 11, wherein
    the reference object is a printed circuit board (PCB),
    the reference file includes diagnostic information that identifies an abnormal structure on the PCB,
    the first POI includes the abnormal structure, and
    the computer readable program code causes the computer to generate the virtual x-ray representation with a highlighted region that overlaps the PCB in the AR workspace to indicate a location of the abnormal structure on the PCB.

19. The non-transitory CRM of claim 11, wherein the computer readable program code causes the computer to:
    obtain the image of the AR workspace with a Projection with Interactive Capture (PIC) device that comprises a camera and a projector, and
    project the virtual x-ray representation into the AR workspace with the projector of the PIC device.

20. A system for visualizing a reference object in an augmented reality (AR) workspace, the system comprising:
    a memory; and
    a processor coupled to the memory, where the processor is configured to:
        calibrate the AR workspace by mapping a first coordinate space to the AR workspace;
        project an interface with control elements onto the AR workspace;
        obtain an image of the AR workspace that includes the interface and the reference object;
        identify the reference object in the image using an image recognition algorithm;
        retrieve a reference file associated with the reference object from the memory, where the reference file includes structural information describing one or more layers of the reference object;
        identify a first point of interest (POI) on the reference object;
        generate, based on the structural information of the reference file, a virtual x-ray representation of structures of the reference object located at the first POI;
        project the virtual x-ray representation onto the AR workspace, wherein
    the virtual x-ray representation includes a rendering of an internal structure of the reference object at the first POI.

* * * * *